(12) United States Patent
Li et al.

(10) Patent No.: US 10,884,926 B2
(45) Date of Patent: Jan. 5, 2021

(54) METHOD AND SYSTEM FOR DISTRIBUTED STORAGE USING CLIENT-SIDE GLOBAL PERSISTENT CACHE

(71) Applicant: Alibaba Group Holding Limited, Grand Cayman (KY)

(72) Inventors: Shu Li, Bothell, WA (US); Jianjian Huo, San Jose, CA (US)

(73) Assignee: Alibaba Group Holding Limited, George Town (KY)

( * ) Notice: Subject to any disclaimer, the term of this patent is extended or adjusted under 35 U.S.C. 154(b) by 87 days.

(21) Appl. No.: 15/625,681

(22) Filed: Jun. 16, 2017

(65) Prior Publication Data

US 2018/0364915 A1 Dec. 20, 2018

(51) Int. Cl.
*G06F 12/00* (2006.01)
*G06F 12/0808* (2016.01)
*G06F 12/128* (2016.01)
*G06F 12/0871* (2016.01)
*G06F 12/0817* (2016.01)

(52) U.S. Cl.
CPC ...... *G06F 12/0808* (2013.01); *G06F 12/0871* (2013.01); *G06F 12/128* (2013.01); *G06F 12/0824* (2013.01); *G06F 2212/1016* (2013.01); *G06F 2212/154* (2013.01); *G06F 2212/222* (2013.01); *G06F 2212/286* (2013.01); *G06F 2212/311* (2013.01); *G06F 2212/452* (2013.01)

(58) Field of Classification Search
None
See application file for complete search history.

(56) References Cited

U.S. PATENT DOCUMENTS

| 4,775,932 A | 10/1988 | Oxley |
| 5,930,167 A | 7/1999 | Lee |
| 6,148,377 A | 11/2000 | Carter |

(Continued)

FOREIGN PATENT DOCUMENTS

| JP | 2003022209 | 1/2003 |
| JP | 2011175422 | 9/2011 |

(Continued)

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007). Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

(Continued)

*Primary Examiner* — Baboucarr Faal
(74) *Attorney, Agent, or Firm* — Shun Yao; Park, Vaughan, Fleming & Dowler LLP

(57) ABSTRACT

One embodiment of the present invention provides a system for facilitating a distributed storage system. The system receives, by a first client-serving machine, a first request to write data. The system writes the data to a first persistent cache associated with the first client-serving machine, wherein a persistent cache includes non-volatile memory. The system records, in an entry in a global data structure, a status for the data prior to completing a write operation for the data in a storage server, wherein the status indicates that the data has been stored in the first persistent cache but has not yet been stored in the storage server.

20 Claims, 15 Drawing Sheets

(56) References Cited

U.S. PATENT DOCUMENTS

| | | |
|---|---|---|
| 6,226,650 B1 | 5/2001 | Mahajan et al. |
| 7,565,454 B2 | 7/2009 | Zuberi |
| 7,958,433 B1 | 6/2011 | Yoon |
| 8,085,569 B2 | 12/2011 | Kim |
| 8,144,512 B2 | 3/2012 | Huang |
| 8,166,233 B2 | 4/2012 | Schibilla |
| 8,260,924 B2 | 9/2012 | Koretz |
| 8,281,061 B2 | 10/2012 | Radke |
| 8,452,819 B1 | 5/2013 | Sorenson, III |
| 8,516,284 B2 | 8/2013 | Chan |
| 8,751,763 B1 | 6/2014 | Ramarao |
| 8,825,937 B2 | 9/2014 | Atkisson |
| 9,043,545 B2 | 5/2015 | Kimmel |
| 9,088,300 B1 | 7/2015 | Chen |
| 9,092,223 B1 | 7/2015 | Pani |
| 9,280,472 B1 | 3/2016 | Dang |
| 9,280,487 B2 | 3/2016 | Candelaria |
| 9,436,595 B1 | 9/2016 | Benitez |
| 9,529,601 B1 | 12/2016 | Dharmadhikari |
| 9,588,698 B1 | 3/2017 | Karamcheti |
| 9,588,977 B1 | 3/2017 | Wang |
| 10,013,169 B2 | 7/2018 | Fisher |
| 10,229,735 B1 | 3/2019 | Natarajan |
| 10,235,198 B2 | 3/2019 | Qiu |
| 2002/0010783 A1 | 1/2002 | Primak |
| 2002/0073358 A1 | 6/2002 | Atkinson |
| 2002/0161890 A1 | 10/2002 | Chen |
| 2003/0163594 A1 | 8/2003 | Aasheim |
| 2003/0163633 A1 | 8/2003 | Aasheim |
| 2003/0217080 A1 | 11/2003 | White |
| 2004/0010545 A1 | 1/2004 | Pandya |
| 2004/0103238 A1 | 5/2004 | Avraham |
| 2004/0255171 A1 | 12/2004 | Zimmer |
| 2004/0268278 A1 | 12/2004 | Hoberman |
| 2005/0038954 A1 | 2/2005 | Saliba |
| 2005/0097126 A1 | 5/2005 | Cabrera |
| 2005/0177755 A1 | 8/2005 | Fung |
| 2005/0195635 A1 | 9/2005 | Conley |
| 2005/0235067 A1 | 10/2005 | Creta |
| 2005/0235171 A1 | 10/2005 | Igari |
| 2006/0156012 A1 | 7/2006 | Beeson |
| 2007/0033323 A1 | 2/2007 | Gorobets |
| 2007/0061502 A1 | 3/2007 | Lasser |
| 2007/0101096 A1 | 5/2007 | Gorobets |
| 2007/0283081 A1 | 12/2007 | Lasser |
| 2007/0285980 A1 | 12/2007 | Shimizu |
| 2008/0034154 A1 | 2/2008 | Lee |
| 2008/0112238 A1 | 5/2008 | Kim |
| 2008/0301532 A1 | 12/2008 | Uchikawa |
| 2009/0113219 A1 | 4/2009 | Aharonov |
| 2009/0282275 A1 | 11/2009 | Yermalayeu |
| 2009/0307249 A1 | 12/2009 | Koifman |
| 2009/0310412 A1 | 12/2009 | Jang |
| 2010/0169470 A1 | 7/2010 | Takashige |
| 2010/0217952 A1 | 8/2010 | Iyer |
| 2010/0229224 A1 | 9/2010 | Etchegoyen |
| 2010/0325367 A1* | 12/2010 | Kornegay ............ G06F 12/0804 |
| | | 711/143 |
| 2011/0055458 A1 | 3/2011 | Kuehne |
| 2011/0055471 A1 | 3/2011 | Thatcher |
| 2011/0099418 A1 | 4/2011 | Chen |
| 2011/0153903 A1 | 6/2011 | Hinkle |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0292538 A1 | 12/2011 | Haga |
| 2011/0299317 A1 | 12/2011 | Shaeffer |
| 2011/0302353 A1 | 12/2011 | Confalonieri |
| 2012/0084523 A1 | 4/2012 | Littlefield |
| 2012/0117399 A1 | 5/2012 | Chan |
| 2012/0147021 A1 | 6/2012 | Cheng |
| 2012/0159289 A1 | 6/2012 | Piccirillo |
| 2012/0210095 A1 | 8/2012 | Nellans |
| 2012/0246392 A1 | 9/2012 | Cheon |
| 2012/0278579 A1 | 11/2012 | Goss |
| 2012/0284587 A1 | 11/2012 | Yu |
| 2013/0061029 A1 | 3/2013 | Huff |
| 2013/0073798 A1 | 3/2013 | Kang |
| 2013/0080391 A1 | 3/2013 | Raichstein |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0166820 A1 | 6/2013 | Batwara |
| 2013/0173845 A1 | 7/2013 | Aslam |
| 2013/0191601 A1 | 7/2013 | Peterson |
| 2013/0219131 A1 | 8/2013 | Alexandron |
| 2013/0318283 A1 | 11/2013 | Small |
| 2014/0019650 A1 | 1/2014 | Li |
| 2014/0082273 A1 | 3/2014 | Segev |
| 2014/0108414 A1 | 4/2014 | Stillerman |
| 2014/0181532 A1 | 6/2014 | Camp |
| 2014/0195564 A1 | 7/2014 | Talagala |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0359229 A1* | 12/2014 | Cota-Robles .......... G06F 9/455 |
| | | 711/143 |
| 2014/0365707 A1 | 12/2014 | Talagala |
| 2015/0019798 A1 | 1/2015 | Huang |
| 2015/0082317 A1 | 3/2015 | You |
| 2015/0106556 A1 | 4/2015 | Yu |
| 2015/0106559 A1 | 4/2015 | Cho |
| 2015/0142752 A1 | 5/2015 | Chennamsetty |
| 2015/0227316 A1 | 8/2015 | Warfield |
| 2015/0277937 A1 | 10/2015 | Swanson |
| 2015/0301964 A1 | 10/2015 | Brinicombe |
| 2015/0304108 A1 | 10/2015 | Obukhov |
| 2015/0363271 A1* | 12/2015 | Haustein ............ G06F 11/1464 |
| | | 707/682 |
| 2015/0372597 A1 | 12/2015 | Luo |
| 2016/0014039 A1 | 1/2016 | Reddy |
| 2016/0026575 A1 | 1/2016 | Samanta |
| 2016/0048341 A1 | 2/2016 | Constantinescu |
| 2016/0098344 A1 | 4/2016 | Gorobets |
| 2016/0110254 A1 | 4/2016 | Cronie |
| 2016/0162187 A1 | 6/2016 | Lee |
| 2016/0179399 A1 | 6/2016 | Melik-Martirosian |
| 2016/0203000 A1 | 7/2016 | Parmar |
| 2016/0232103 A1 | 8/2016 | Schmisseur |
| 2016/0239074 A1 | 8/2016 | Lee |
| 2016/0239380 A1 | 8/2016 | Wideman |
| 2016/0274636 A1 | 9/2016 | Kim |
| 2016/0306853 A1 | 10/2016 | Sabaa |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2017/0010652 A1 | 1/2017 | Huang |
| 2017/0075583 A1 | 3/2017 | Alexander |
| 2017/0075594 A1 | 3/2017 | Badam |
| 2017/0109232 A1 | 4/2017 | Cha |
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0212708 A1 | 7/2017 | Suhas |
| 2017/0228157 A1 | 8/2017 | Yang |
| 2017/0249162 A1 | 8/2017 | Tsirkin |
| 2017/0262178 A1 | 9/2017 | Hashimoto |
| 2017/0285976 A1 | 10/2017 | Durham |
| 2017/0286311 A1 | 10/2017 | Juenemann |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0088867 A1 | 3/2018 | Kaminaga |
| 2018/0107591 A1 | 4/2018 | Smith |
| 2018/0143780 A1 | 5/2018 | Cho |
| 2018/0167268 A1 | 6/2018 | Liguori |

(56) References Cited

U.S. PATENT DOCUMENTS

| | | |
|---|---|---|
| 2018/0189182 A1 | 7/2018 | Wang |
| 2018/0212951 A1 | 7/2018 | Goodrum |
| 2018/0270110 A1 | 9/2018 | Chugtu |
| 2018/0293014 A1 | 10/2018 | Ravimohan |
| 2018/0329776 A1 | 11/2018 | Lai |
| 2018/0356992 A1 | 12/2018 | Lamberts |
| 2018/0373428 A1 | 12/2018 | Kan |
| 2019/0012111 A1 | 1/2019 | Li |
| 2019/0073262 A1 | 3/2019 | Chen |
| 2019/0205206 A1 | 7/2019 | Hornung |

FOREIGN PATENT DOCUMENTS

| | | |
|---|---|---|
| WO | 9418634 | 8/1994 |
| WO | 1994018634 | 8/1994 |

OTHER PUBLICATIONS

EMC Powerpath Load Balancing and Failover Comparison with native MPIO operating system solutions. Feb. 2011.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices"< FAST '11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

* cited by examiner

TABLE 350

| DATA FLAG 352 | BRIEF DESCRIPTION 354 | COMMENTS 356 |
|---|---|---|
| 00 | <Initial state> | No data has been written. A read cannot occur due to a lack of data. |
| 10 | <Updated in client cluster; not updated in storage cluster> | Data has been written to the client server's persistent cache. Data has not yet been written to the storage cluster. |
| 11 | <Updated in client cluster; updated in storage cluster> | Data has been successfully written to the storage server. The data in the client server's persistent cache is ready to be deleted. |
| 01 | <Data not available in client cluster; updated in storage cluster> | Data has been successfully deleted from the persistent cache. Data has been written to the storage server. |

FIG. 3B

METHOD AND SYSTEM FOR DISTRIBUTED STORAGE USING CLIENT-SIDE GLOBAL PERSISTENT CACHE

BACKGROUND

Field

This disclosure is generally related to the field of data storage. More specifically, this disclosure is related to a system and method for distributed storage using a client-side global persistent cache.

Related Art

The proliferation of the Internet and e-commerce continues to create a vast amount and types of digital content. Distributed storage systems have been created to access and store such digital content. A traditional distributed storage system may include a cluster of client servers and a cluster of storage servers. The client cluster can receive I/O requests and merge small sectors into larger blocks, while the storage cluster can manage the persistent storage of data. In such a system, an I/O request must traverse a path which includes, e.g., a client server, various switches, a network, a storage server, and a storage device. Completion of the I/O request may result in a long latency in both software and hardware on such a path. Furthermore, the Quality of Service (QoS) may be affected based on various factors along the path. Thus, in a traditional distributed storage system, it may be challenging to meet the performance-driven needs of applications which require both a short latency and a high bandwidth.

Furthermore, a distributed storage system may require both data consistency and robustness. For example, the system must first store the data in persistent storage with data recovery protection (e.g., replicas and erasure coding) before notifying the host that the data has been securely committed. Storing the data in persistent storage requires a traversal along the aforementioned path, which can create challenges in providing a short latency as well as data consistency and robustness. These challenges can decrease the efficiency of a traditional distributed storage system.

SUMMARY

One embodiment of the present invention provides a system for facilitating a distributed storage system. During operation, the system receives, by a first client-serving machine, a first request to write data. The system writes the data to a first persistent cache associated with the first client-serving machine, wherein a persistent cache includes non-volatile memory. The system records, in an entry in a global data structure, a status for the data prior to completing a write operation for the data in a storage server, wherein the status indicates that the data has been stored in the first persistent cache but has not yet been stored in the storage server.

In some embodiments, completing the write operation for the data in the storage server further comprises: determining two or more storage servers of a storage cluster to which the data is to be written; and in response to successfully writing the data to the determined storage servers, updating the status in the entry to indicate that the data has been stored in the storage cluster and may be deleted from the first persistent cache.

In some embodiments, the system receives a second request to read the data. The system obtains, from the entry in the global data structure, a current status for the data. In response to determining that the current status indicates that the data has been stored in the first persistent cache, the system reads the data from the first persistent cache. In response to determining that the current status indicates that the data has been deleted from the first persistent cache and has been stored in the storage cluster, the system reads the data from the storage cluster. In response to successfully reading the data from the first persistent cache or the storage cluster, the system returns the data indicated in the second request.

In some embodiments, the global data structure is maintained by a metadata-managing machine. The system receives, by the first client-serving machine from the metadata-managing machine, a first notification that the entry has been successfully created and that the data may be committed to the first persistent cache, wherein the entry includes metadata associated with the data. In response to the first notification, the system sends the confirmation of the first request.

In some embodiments, the system writes the data to a second persistent cache associated with a second client-serving machine. The first client-serving machine and the second client-serving machine are assigned as a pair for facilitating high availability, wherein the second persistent cache is a paired mirror cache of the first persistent cache, and wherein the data is written directly to the second persistent cache based on a direct memory access protocol and without involving a CPU of the second client-serving machine.

In some embodiments, writing the data to and reading the data from the first persistent cache is based on a barrel shifter technique. The data is sequentially written to the first persistent cache. Upon detecting that the first persistent cache is full, the data is written starting from a beginning address of the cache. A location for the data is an offset which is a logical address of the data location.

In some embodiments, writing the data to the first persistent cache further comprises: writing the data to a block in the first persistent cache; in response to reading the block and successfully writing the data to the storage server, marking the block as copied to storage and ready to be deleted, wherein the data may be read from the block until the data is deleted; and in response to determining a cache deletion condition: deleting the data from the marked block; and marking the block as free.

In some embodiments, determining the cache deletion condition includes one or more of: determining that the block resides within a free region of the cache; determining that the block is due for a garbage collection process; determining that the block exhibits a level of wear above a predetermined threshold; and determining any condition which requires moving other data.

In some embodiments, the system sends a confirmation of the first request without storing the data in the storage server.

BRIEF DESCRIPTION OF THE FIGURES

FIG. 3B illustrates a table indicating data flag or state values and corresponding descriptions, in accordance with an embodiment of the present application.

In the figures, like reference numerals refer to the same figure elements.

DETAILED DESCRIPTION

Figure 1:
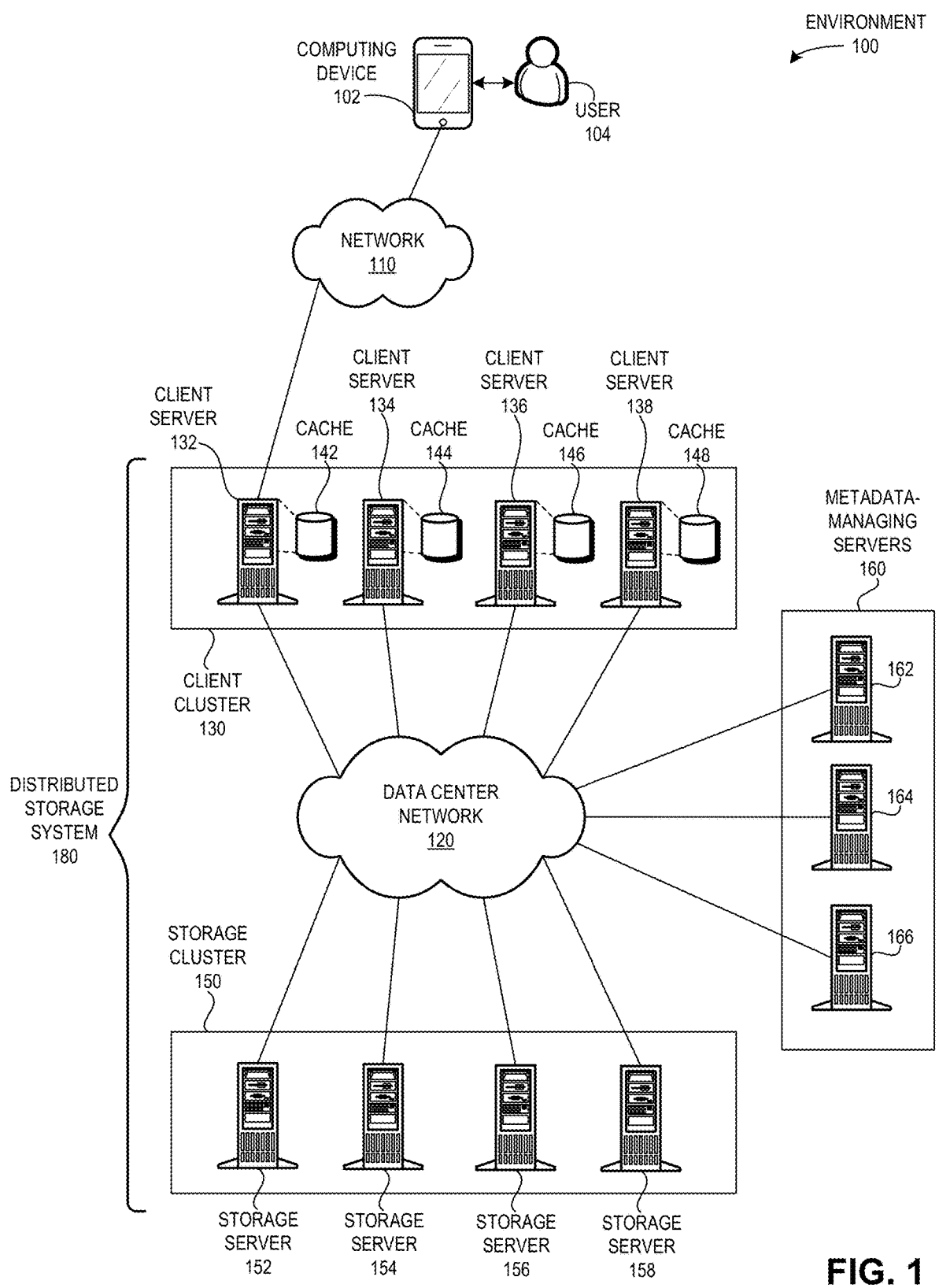
FIG. 1 illustrates an exemplary environment that facilitates a distributed storage system with a client-side global persistent cache, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of increasing the efficiency in a distributed storage system by providing a global persistent cache at the client side. In a traditional distributed storage system, an I/O request must traverse a path which includes, e.g., a client server, various switches, a network, a storage server, and a storage device. Because of these many layers and devices, completion of the I/O request may result in a long latency. Furthermore, the QoS may be affected based on various factors along the path. In addition, in a traditional distributed storage system, data must first be stored in persistent storage (with data recovery protection), in advance of notifying the host that the data has been securely committed. Storing the data in persistent storage requires a traversal along the aforementioned path, which can create challenges in providing a short latency as well as data consistency and robustness. These challenges can decrease the efficiency of a traditional distributed storage system.

Embodiments of the present invention address these challenges by providing a system in which a global persistent cache resides in the client cluster, which decreases both the path traversed by I/O operations and the corresponding latency to complete an I/O operation. The client cluster can include multiple client servers, which each have their own persistent cache (i.e., non-volatile memory). The system can pair two client servers together, such that the persistent cache on a first client server and the persistent cache on a second client server, together, form a "paired mirror cache." The system can write incoming data (e.g., from a write operation) to the both the persistent storage of the first client server and the mirrored persistent cache of the second client server, creating two copies of the same data (i.e., dataX). The paired mirror caches can be connected via a high speed point-to-point fabric (e.g., via Remote Direct Memory Access, or RDMA), and can be synchronized instantly.

Once the copies are written to the paired mirror caches, the system can store the metadata of dataX in a global data structure, which can include a file name, an address, an offset, a cache offset, and a state or a data flag associated with the given data (e.g., dataX), as described below in relation to FIGS. 4A and 4B. The global data structure may be accessed by any component in the system. The global data structure may be maintained by a component such as a set of metadata master servers, or distributed across the system. The system can use the data flag associated with given data to execute a read or a write operation.

For example, in a write operation, a first client server can receive a write request for associated data. The first client server can write the data to its local persistent cache and also to the paired mirror cache. The client server can send the metadata for the data to the metadata master servers, which can update the global data structure and mark the data as "updated in client cache; not updated in storage cluster." The system can subsequently write the data to the storage cluster (e.g., first to a primary drive and then to one or more other drives). The system can then mark the data as "updated in client cache; updated in storage cluster," which indicates that the written data in the client cache may be discarded. As another example, in a read operation, a first client server can receive a read request for associated data. The first client server can send the request to the metadata master servers, which can determine the storage path (i.e., client cache or storage server) based on the data flag for the associated data. The system can then read the requested data from the determined storage path. Exemplary write and read operations are described below, respectively, in relation to FIGS. 4A, 4B, and 5. Furthermore, the system can employ a specific method to sequentially write data to a given client-side persistent cache, as described below in relation to FIG. 7.

Thus, embodiments of the present invention provide a system which increases the efficiency of a distributed storage system. The increased efficiency can include an improved performance in latency for completion of I/O tasks, as well as an increased assurance for QoS. By including a global persistent (and mirrored) cache at each client server, the system can achieve high-speed synchronization and high availability. The system can also achieve global data coherency and increased efficiency by executing I/O operations based on the data flags and the client-side persistent caches. Furthermore, the system can improve the usage efficiency of persistent NAND flash storage in client servers based on the cache utilization method.

The term "client server" refers to a client-serving machine, which is part of a distributed storage system. In this invention, a client server is associated with a persistent local cache or storage.

The terms "client cache," "client server cache," "client-side cache," and "client-side persistent cache" refer to a persistent cache or storage associated with a client server or a client-serving machine. A persistent cache includes non-volatile memory.

The term "client cluster" refers to a group of client servers, where a respective client server includes a local persistent cache (e.g., client cache) onto which data may be written for persistent storage. The data in a client cache may be stored or written, moved, read, accessed, or deleted based on a cache utilization method.

The term "storage server" refers to a machine with a drive onto which data may be written for long-term persistent storage.

The term "storage cluster" refers to a group of storage servers, where a respective storage server includes a drive onto which data may be written for persistent storage.

The term "metadata-managing servers" refers to a group of metadata-managing servers or machines, where a respective metadata-managing server can access, create entries in, and respond to queries relating to a global data structure which holds relevant state for the distributed storage system. A metadata-managing server may also determine which remotely located storage servers (and corresponding drives) of a storage cluster are to be written to (i.e., in writing or storing data from the client-side global persistent cache.

Exemplary System

FIG. 1 illustrates an exemplary environment 100 that facilitates a distributed storage system with a client-side global persistent cache, in accordance with an embodiment of the present application. Environment 100 can include a computing device 102 which is associated with a user 104. Computing device 102 can include, for example, a tablet, a mobile phone, an electronic reader, a laptop computer, a desktop computer, or any other computing device. Computing device 102 can communicate via a network 110 with a distributed storage system 180, which can include: a client cluster 130; a storage cluster 150; and metadata-managing servers 160. Client cluster 130, storage cluster 150, and metadata-managing servers 160 can communicate with each other via, e.g., a data center network 120. Client cluster 130 can include client servers (or client-serving machines) 132-138, each with respective local persistent caches 142-148. Storage cluster 150 can include storage servers 152-158. Metadata-managing servers 160 can include servers 162-166.

User 104, via computing device 102, can interact with distributed storage system 180 by sending an I/O request. For example, user 102 may wish to perform a task which involves online transaction processing, such as updating a website page with the number of hits received per second. The latency involved with such a task (e.g., measuring completion of the I/O task) may be used as a factor to determine Quality per Second (QpS). Thus, a company which uses distributed storage system 180 may market an increased or enhanced QpS as a factor for choosing that company's platform. An exemplary communication or interaction for I/O requests, including a write and a read operation, is described below, respectively, in relation to FIGS. 2C and 2D.

Client Pairs and Mirror Caches

Figure 2A:
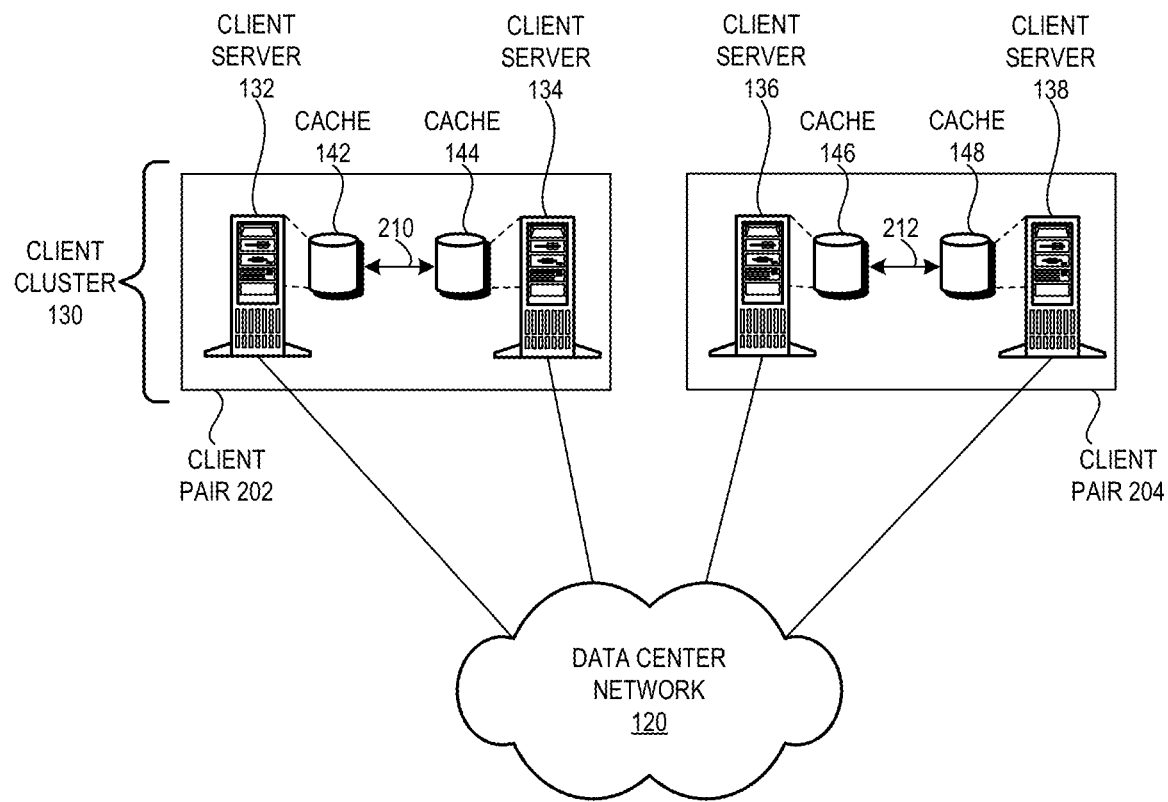
FIG. 2A illustrates exemplary client pairs with their respective paired mirror caches, in accordance with an embodiment of the present application.

FIG. 2A illustrates exemplary client pairs 202 and 204 with their respective paired mirror caches, in accordance with an embodiment of the present application. The system can assign two client servers (which each have a persistent cache) as a pair, where the persistent caches are mirrors of each other. For example, client cluster 130 can include client pair 202 and client pair 204. Client pair 202 can include client server 132 with persistent cache 142 and client server 134 with persistent cache 144. Client pair 204 can include client server 136 with persistent cache 146 and client server 138 with persistent cache 148.

Cache 142 on client server 132 and cache 144 on client server 134 can form a paired mirror cache. The pair of mirror caches can be connected via a high speed point-to-point fabric, which allows the mirror caches to be instantly synchronized. For example, caches 142 and 144 can communicate with each other via a communication 210, such as a Remote Direct Memory Access (RDMA) protocol, which allows a device to access or update memory of an external device without involving the CPU of the external device (or the operating systems of the device and the external device).

Figure 2B:
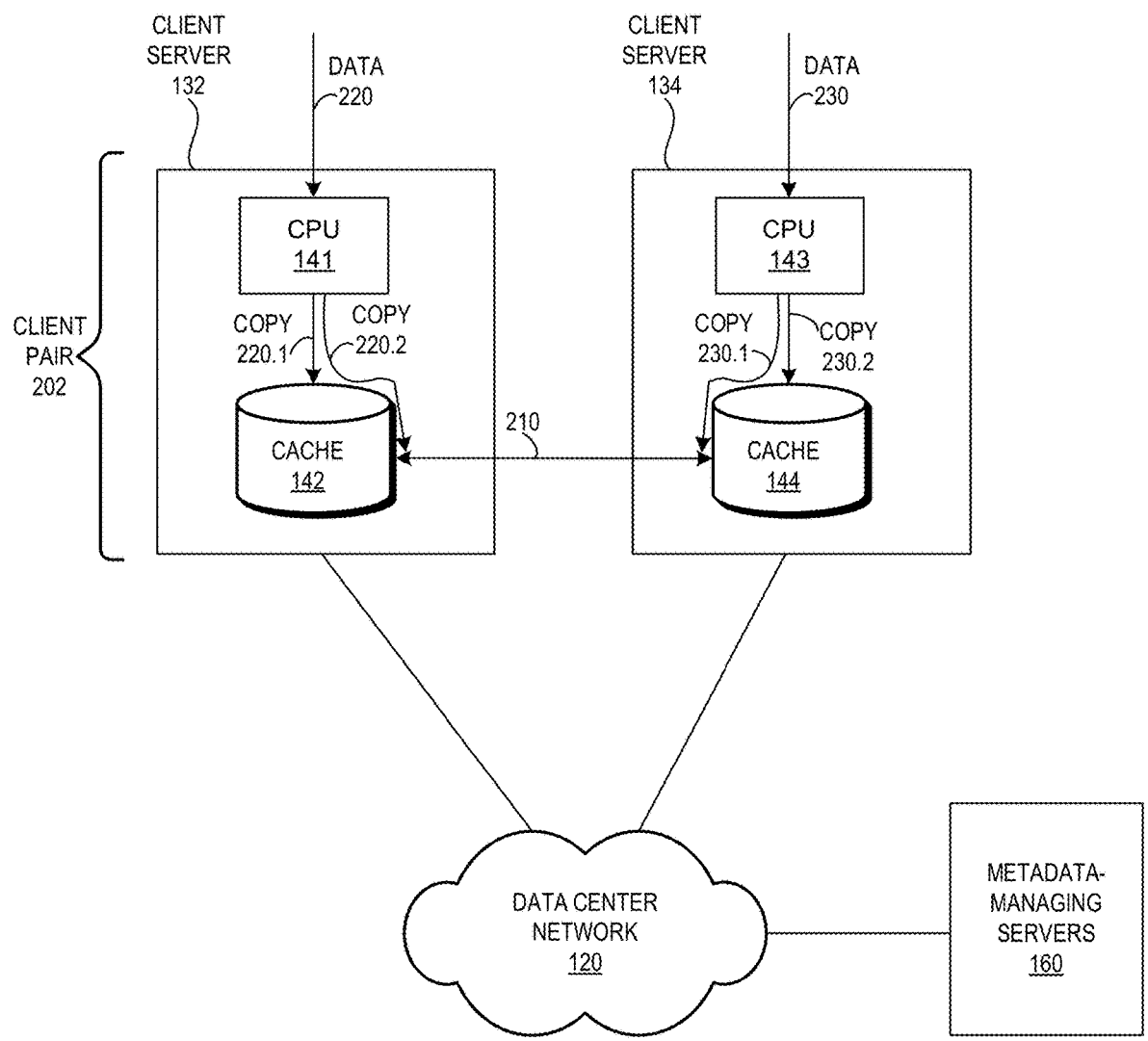
FIG. 2B illustrates exemplary communication within a client pair, including between paired mirror caches acting as persistent storage, in accordance with an embodiment of the present application.

FIG. 2B illustrates exemplary communication within a client pair 202, including between paired mirror caches acting as persistent storage, in accordance with an embodiment of the present application. As described above in relation to FIG. 2A, client pair 202 can include client servers 132 and 134. Client server 132 can include a CPU 141 and cache 142, and client server 134 can include a CPU 143 and cache 144. Client server 132, via CPU 141, can receive data 220, e.g., via a request to write data 220 to persistent storage, as described below in relation to FIG. 2C. CPU 141 can send a copy 220.1 (of data 220) to cache 142 to be written in cache 142, and at the same time, send a copy 220.2 (of data 220) to cache 144 via communication 210 to be written in cache 144. Copies 220.1 and 220.2 may be written simultaneously, and communication 210 (which is over a high speed point-to-point connection via, e.g., RDMA) can ensure that both copies are written quickly or in a short amount of time. Similarly, client server 134, via CPU 143, can receive data 230, e.g., via a request to write data 230 to persistent storage, as described below in relation to FIG. 2C. CPU 143 can send a copy 230.1 (of data 230) to cache 144 to be written in cache 144, and at the same time, send a copy 230.2 (of data 230) to cache 142 via communication 210 to be written in cache 142.

Subsequently, client servers 132 and 134 can send the appropriate metadata to metadata-managing servers 160, which can update the global data structure holding the global state for the distributed storage system. In some embodiments, the system can track the paired client servers, such that client server 132 sending the corresponding metadata can indicate that data 220 has been successfully copied to cache 144 of paired client server 134.

Exemplary Communication During a Write Operation

Figure 2C:
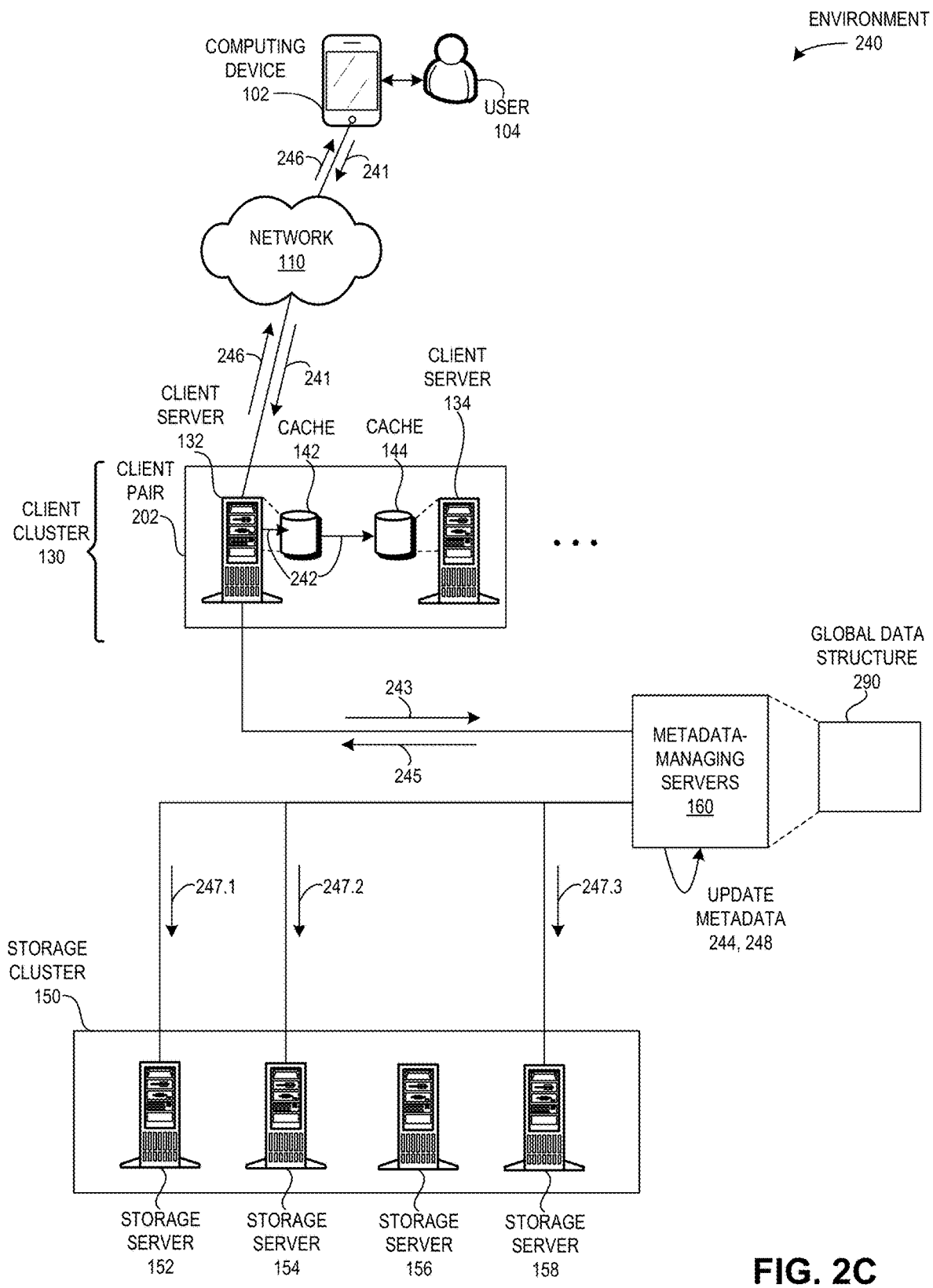
FIG. 2C illustrates exemplary communication in an exemplary environment during a write operation, in accordance with an embodiment of the present application.

FIG. 2C illustrates exemplary communication in an exemplary environment 240 during a write operation, in accordance with an embodiment of the present application. Environment 240 is similar to environment 100 of FIG. 1, but data center network 120 has been omitted for the sake of illustration. During operation, user 104, via computing device 102, can send a request 241 to write data to persistent storage. Request 241 can travel through network 110 and be received by client server 132. The CPU of client server 132 can send a copy of the data to be written to its local persistent cache 142 (communication 242), and can also send a copy of the data to be written to the persistent paired mirror cache 144 (communication 242) (as described above in relation to FIG. 2B). Client server 132 can send the corresponding metadata to metadata-managing servers 160 (communication 243), which can create in a global data structure 290 an entry for the written data which includes the metadata associated with the written data (update metadata function 244). Metadata-managing servers 160 can also record in the entry a status or a data flag that indicates that the data has been written to the client server's persistent cache, but is waiting to be written to the storage cluster (update metadata function 248) (e.g., data flag=10, as described below in relation to FIG. 3B).

Metadata-managing servers 160 can send to client server 132 a notification message 245 indicating that the global state has been successfully updated with the corresponding metadata, and that the written data may be committed. In response to notification 245, client server 132 can send a confirmation 246, via network 110, to user 104 via computing device 102.

Metadata-managing servers 160 can also determine the storage servers to which the data is to be written, and cause the data to be written to, e.g., storage servers 152, 154, and 158, via, respectively, communications 247.1-247.3. Note that while the data appears to be written from metadata-managing servers 160, the data may be written from a client server. When the data has been successfully written to the determined storage servers, metadata-managing servers 160 can update the status of the corresponding entry to indicate that the data has been successfully written to the storage cluster and may be deleted from the client server's persistent cache (update metadata function 248) (e.g., data flag=11, as described below in relation to FIG. 3B).

Exemplary Communication During a Read Operation

Figure 2D:
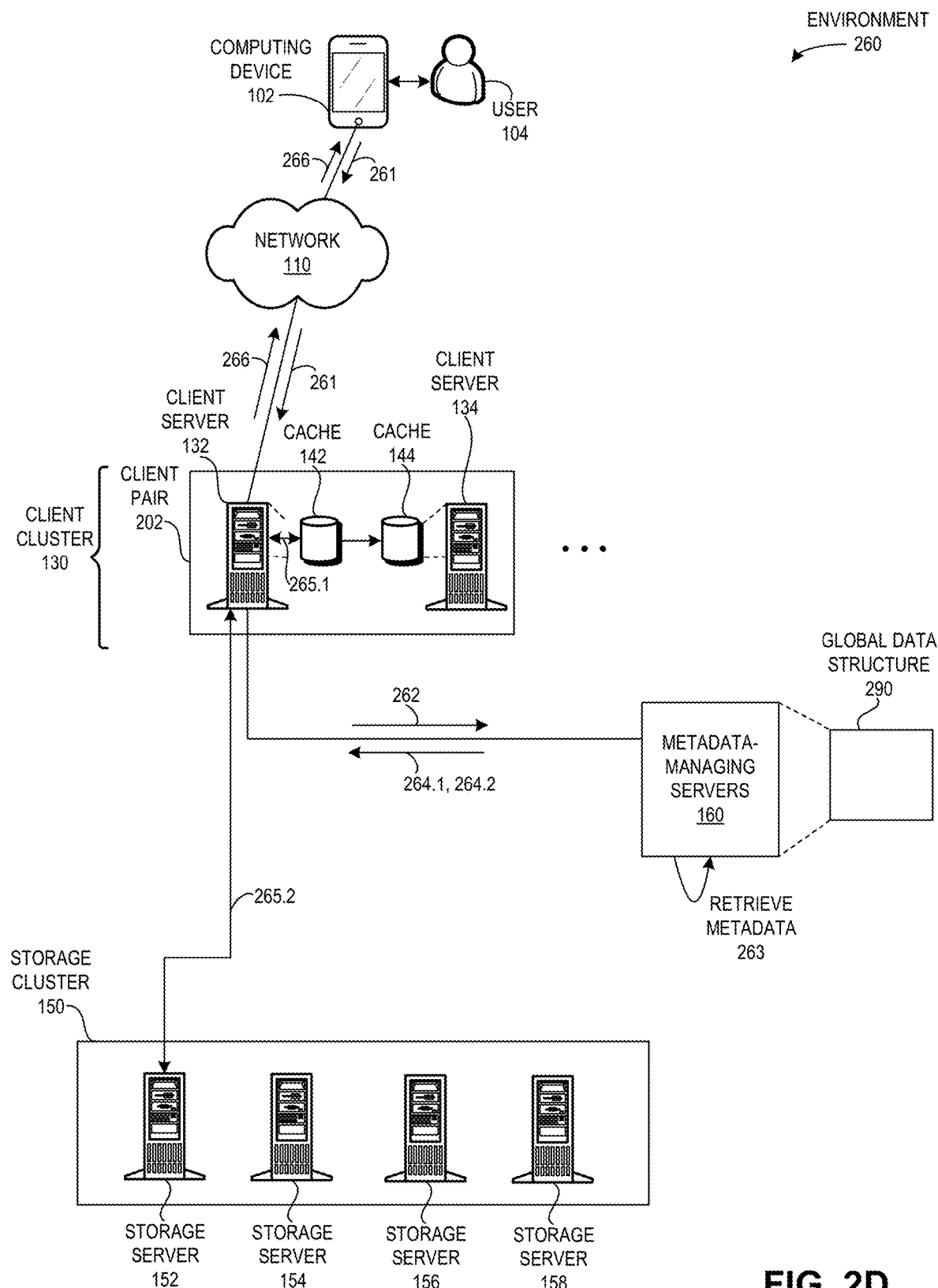
FIG. 2D illustrates exemplary communication in an exemplary environment during a read operation, in accordance with an embodiment of the present application.

FIG. 2D illustrates exemplary communication in an exemplary environment 260 during a read operation, in accordance with an embodiment of the present application. Environment 260 is similar to environment 240 of FIG. 2C, where data center network 120 has been omitted for the sake of illustration. During operation, user 104, via computing device 102, can send a request 261 to read data from persistent storage of a distributed storage system which includes, e.g., client cluster 130, metadata-managing servers 160, and storage cluster 150. Request 261 can travel through network 110 and be received by client server 132. Client server 132 can send a query 262 to metadata-managing servers 160 to determine whether the data is to be read from a client server cache or from the storage cluster. Metadata-managing servers 160 can retrieve from global data structure 170 the metadata for the data to be read (retrieve metadata function 263). If metadata-managing servers 160 sends a message 264.1 indicating that the requested data is to be read from the client cache (e.g., the status of the data flag=10 or 11), client server 132 reads the requested data from cache 142 (communication 265.1). If metadata-managing servers 160 sends a message 264.2 indicating that the requested data is to be read from the storage server (e.g., the status of the data flag=01), client server 132 reads the requested data from (the indicated storage server in) the storage cluster (communication 265.2). Client server 132 can subsequently return the read data to user 104 via computing device 102 (communication 266).

Thus, embodiments of the present invention provide a distributed storage system in which data is written to a local persistent cache of a first client-serving machine, and then written directly to a persistent cache of a second client-serving machine without involving a CPU of the second client-serving machine. Metadata-managing machines maintain a global data structure which includes a state of the distributed storage system, such as whether data has been successfully written to a client-serving machine's persistent cache or to a remotely located storage server of a storage cluster. Embodiments of the present invention further allow a metadata-managing machine to update the global data structure, and allow the first client-serving machine to send a confirmation of a write request before the data has been written to a storage server. This can result in increased efficiency, by decreasing the number of network layers and devices which must be traversed in order for data to be successfully written to a persistent storage medium.

Exemplary Global Data Structure for Metadata; Exemplary Data Flags

Figure 3A:
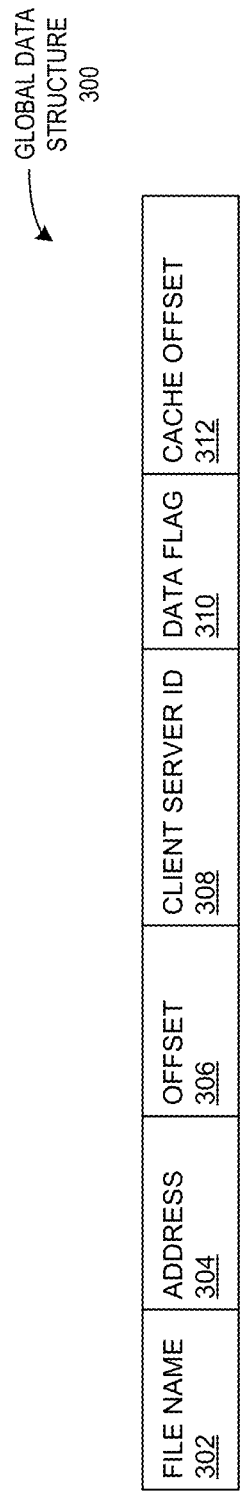
FIG. 3A illustrates an exemplary global data structure for storing and updating the state of data in a distributed storage system, in accordance with an embodiment of the present application.

FIG. 3A illustrates an exemplary global data structure 300 for storing and updating the state of data in a distributed storage system, in accordance with an embodiment of the present application. Data structure 300 can include entries with a file name 302, an address 304, an offset 306, a client server identifier 308, a data flag 310, and a cache offset 312. Data flag 310 can indicate a current state of the corresponding data.

FIG. 3B illustrates a table 350 indicating data flag or state values and corresponding descriptions, in accordance with an embodiment of the present application. Table 350 depicts entries with a data flag 352, a brief description 354, and comments 356. When the data flag has a value of "00," the data has not been written to the cache. A read cannot occur because of a lack of data. When the data flag has a value of "10," the data has been written to the client server's persistent cache, but has not yet been written to the storage cluster or stored in a storage server. Note that after the data flag has been set to a value of "10," the client server which received the I/O request can synchronize the path of the data with the metadata-managing servers, which can determine to which (multiple) storage servers in the storage cluster to write the data. If a read operation occurs while the data flag has a value of "10," the data will be read from the client server's persistent cache.

When the data flag has a value of "11," the data has been successfully written to the storage cluster or stored in a storage server. That is, the (multiple) copies have been successfully written to the storage servers in the storage cluster. The data in the client server's persistent cache is ready to be deleted, e.g., based on a cache utilization method, as described below in relation to FIGS. 7A and 7B. If a read operation occurs while the data flag has a value of "11," the data may be read from either the client server's persistent cache or from the storage cluster. In some embodiments, when the data flag has a value of "11," the metadata-managing masters will indicate to the requesting client server to read the data from the client server's persistent cache. This may result in a more efficient read operation, as retrieving data from the client server's persistent cache may be quicker than retrieving data from a remotely located storage server in the storage cluster.

When the data flag has a value of "01," the data is no longer available in the client server's persistent cache. The data has been written to the storage server, and the data may only be read from the storage server.

Method for Writing Data in a Distributed Storage System

Figure 4A:
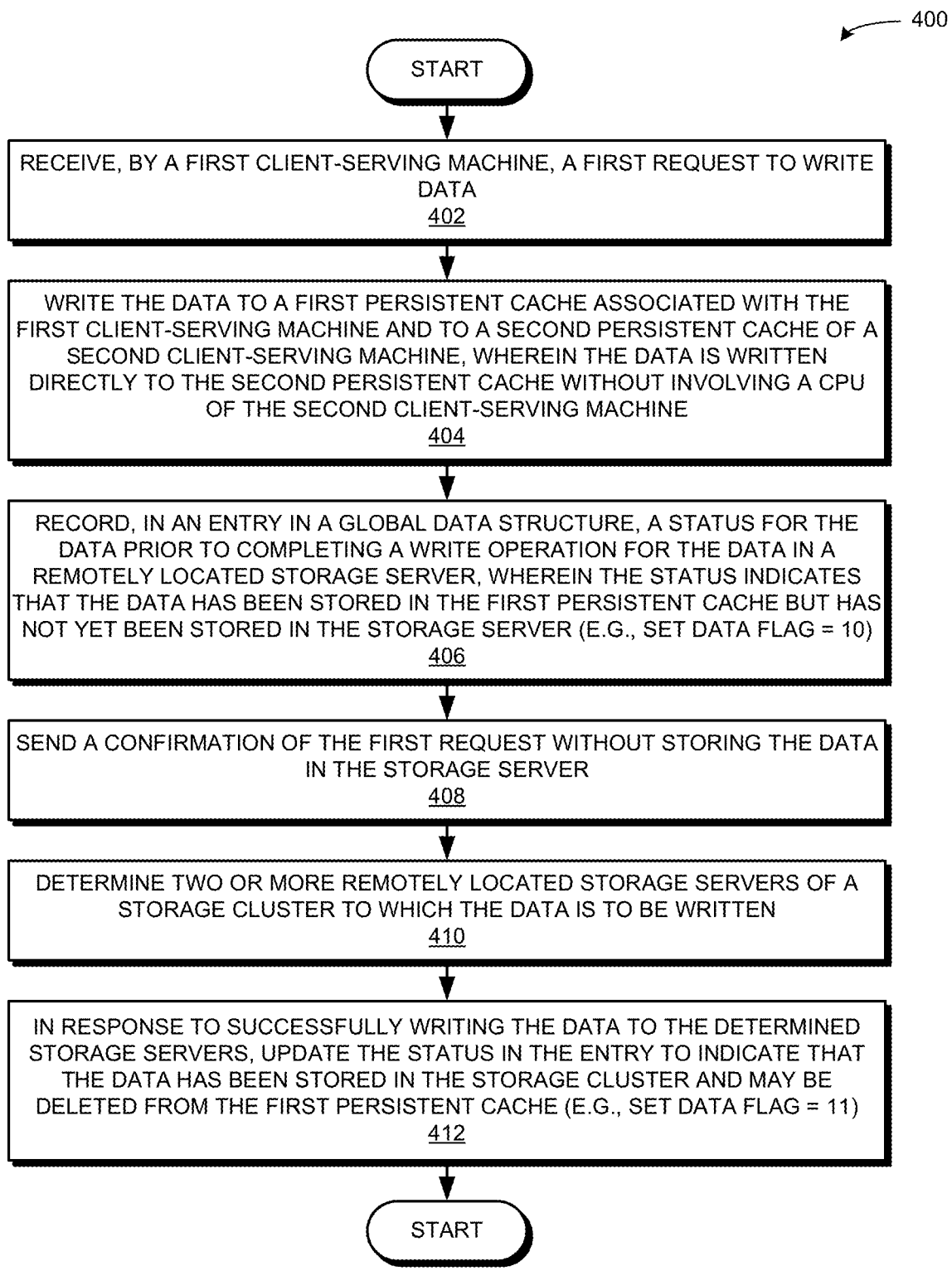
FIG. 4A presents a flowchart illustrating a method for writing data in a distributed storage system with a client-side global persistent cache, in accordance with an embodiment of the present application.

FIG. 4A presents a flowchart 400 illustrating a method for writing data in a distributed storage system with a client-side global persistent cache, in accordance with an embodiment of the present application. During operation, the system receives, by a first client-serving machine, a first request to write data (operation 402). The system writes the data to a first persistent cache associated with the first client-serving machine and to a second persistent cache associated with a second client-serving machine, wherein the data is written directly to the second persistent cache without involving a CPU of the second client-serving machine (operation 404). A persistent cache includes non-volatile memory. The system records, in an entry in a global data structure, a status for the data prior to completing a write operation for the data in a remotely located storage server, wherein the status indicates that the data has been stored in the first persistent cache but has not yet been stored in the storage server (e.g., set data flag=10) (operation 406). The system sends a confirmation of the first request without storing the data in the storage server (operation 408).

The system determines two or more remotely located storage servers of a storage cluster to which the data is to be written (operation 410). In response to successfully writing the data to the determined storage servers, the system updates the status in the entry to indicate that the data has been stored in the storage cluster and may be deleted from the first persistent cache (e.g., set data flag=11) (operation 412). In some embodiments, operations 406, 410, and 412 may be performed by a metadata-managing server or servers, and the global data structure may be accessible to all client-serving machines in a client cluster and to all storage servers in the storage cluster.

Figure 4B:
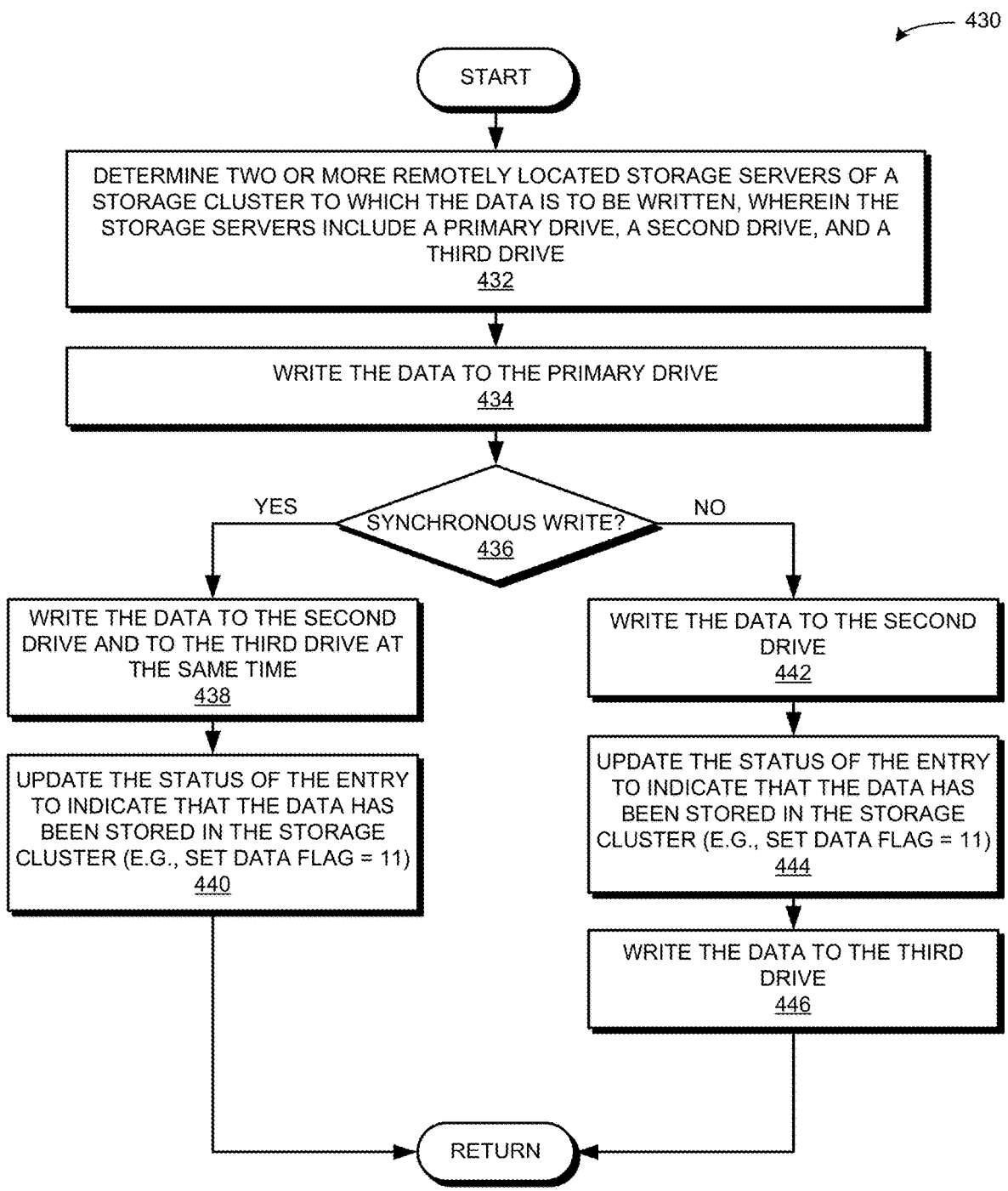
FIG. 4B presents a flowchart illustrating a method for writing data in a distributed storage system with a client-side global persistent cache, based on a synchronous write to the storage servers, in accordance with an embodiment of the present application.

FIG. 4B presents a flowchart 430 illustrating a method for writing data in a distributed storage system with a client-side global persistent cache, based on a synchronous write to the storage servers, in accordance with an embodiment of the present application. During operation, the system determines two or more remotely located storage servers of a storage cluster to which the data is to be written, wherein the storage servers include a primary drive, a second drive, and a third drive (operation 432). A storage server may be associated with a respective drive. The system writes the data to the primary drive (operation 434). The system determines whether a synchronous write is necessary (decision 436). If it is, the system writes the data to the second drive and the third drive at the same time (operation 438), and updates the status of the entry to indicate that the data has been stored in the storage cluster (e.g., set data flag=11) (operation 440). This updated status also indicates that the data is ready to be deleted or removed from the client-serving machine's persistent cache.

If a synchronous write is not necessary (decision 436), the system writes the data to the second drive (operation 442), and updates the status of the entry to indicate that the data has been stored in the storage cluster (e.g., set data flag=11) (operation 444, similar to operation 440). Subsequently, the system writes the data to the third drive (operation 446).

Method for Reading Data in a Distributed Storage System

Figure 5:
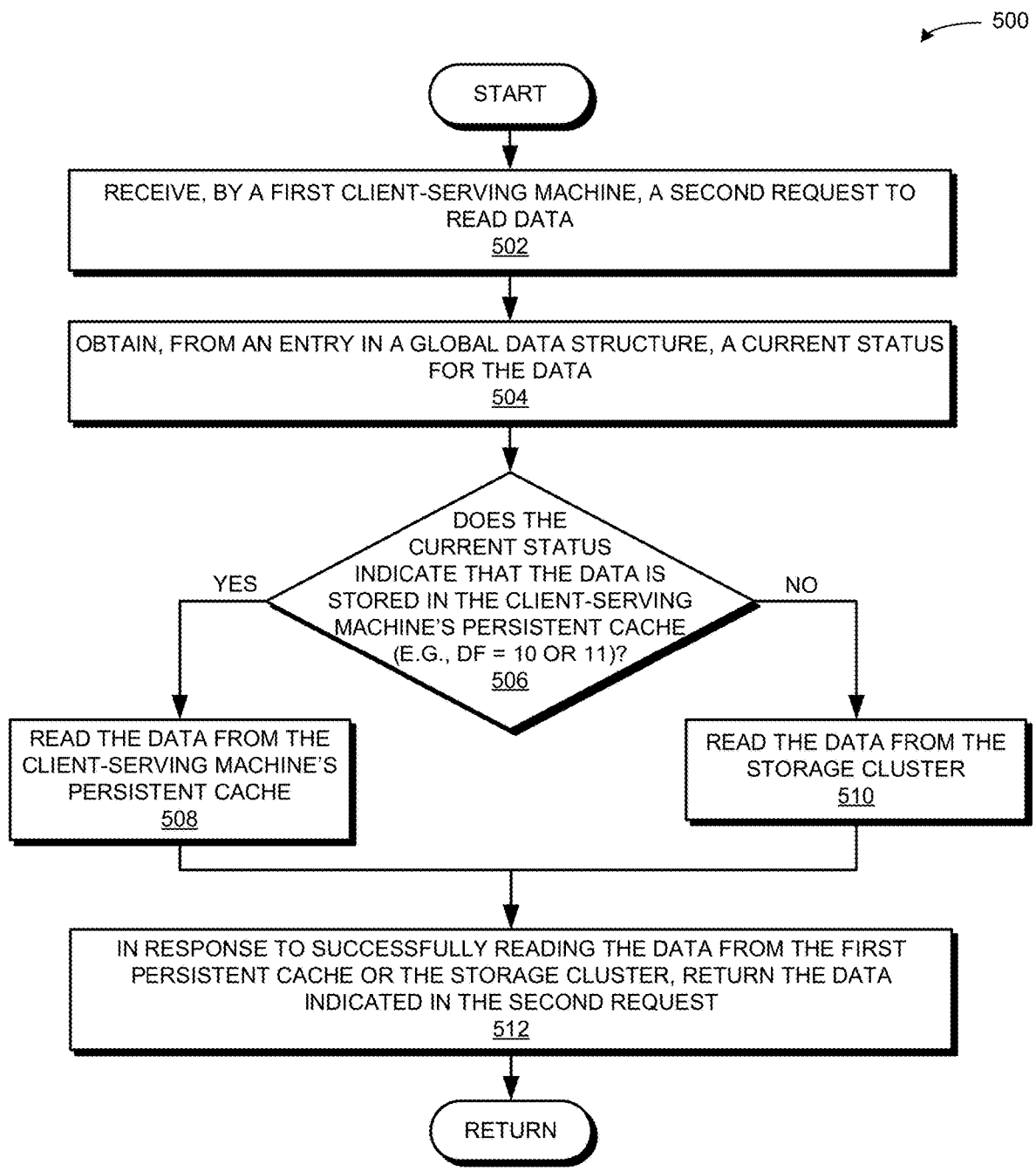
FIG. 5 presents a flowchart illustrating a method for reading data in a distributed storage system with a client-side global persistent cache, in accordance with an embodiment of the present application.

FIG. 5 presents a flowchart 500 illustrating a method for reading data in a distributed storage system with a client-side global persistent cache, in accordance with an embodiment of the present application. Note that the operations in FIG. 5 may occur subsequent to data being written to the system, as described above in relation to FIG. 4A. During operation, the system receives, by a first client-serving machine, a second request to read data (operation 502). The second request may be sent by a requesting user. The system obtains, from an entry in a global data structure, a current status for the data (operation 504). The status may be read from a data flag field in the global data structure, as described above in relation to FIG. 3B. The system determines whether the current status indicates that the data is stored in the first persistent cache of the client-serving machine (e.g., data flag=10 or 11) (decision 506). If it is, the system reads the data from the client-serving machine's first persistent cache (operation 508). If it is not (e.g., data flag=01), the system reads the data from the storage cluster (operation 510). In response to successfully reading the data from the first persistent cache or the storage cluster, the system returns the data indicated in the second request (operation 512). The system may return the data to the requesting user.

Exemplary Client-Side Persistent Cache and Method for Cache Utilization

Figure 6:
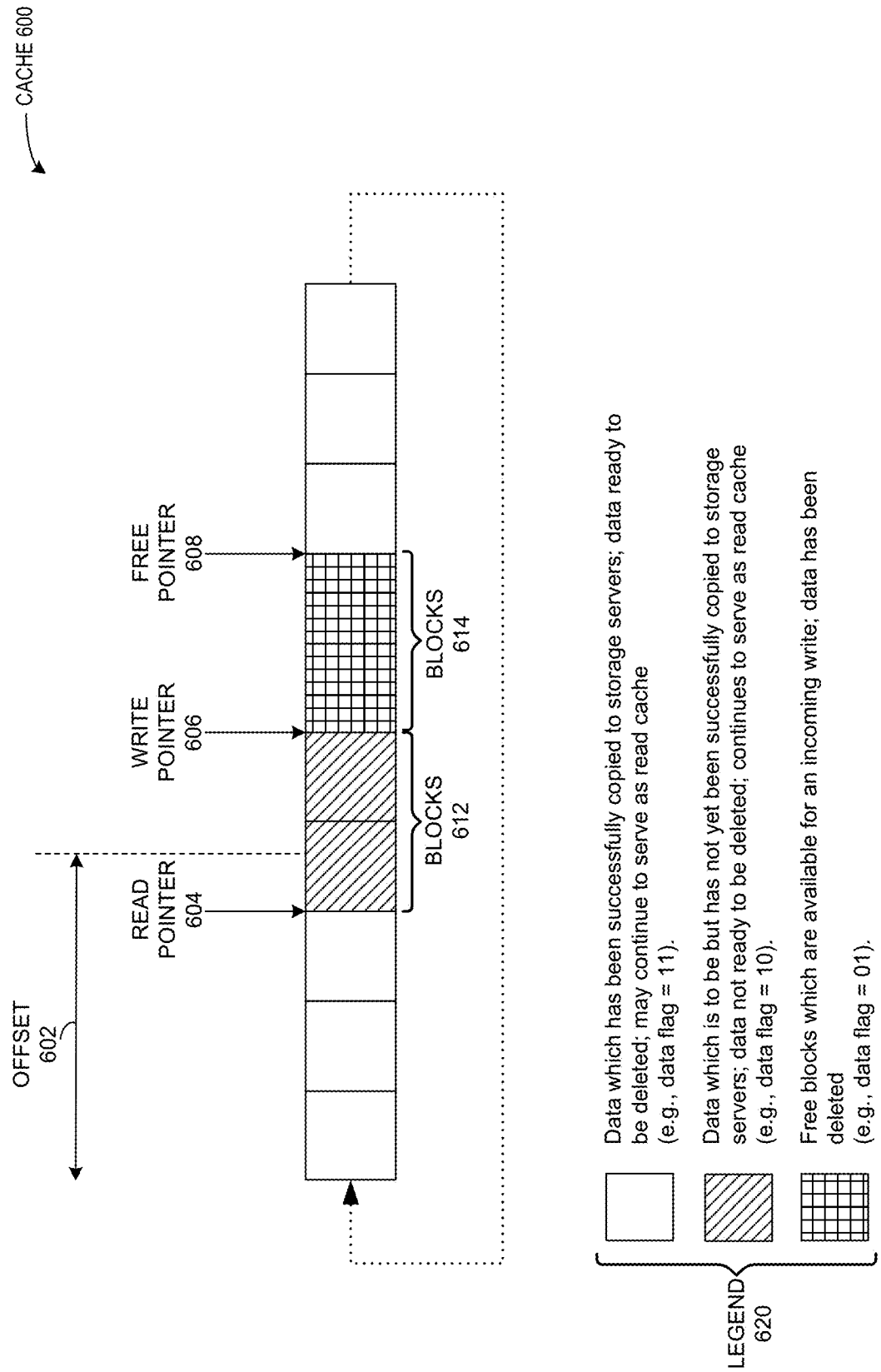
FIG. 6 illustrates an exemplary client-side global persistent cache using a barrel shifter method for cache utilization, in accordance with an embodiment of the present application.

FIG. 6 illustrates an exemplary client-side global persistent cache 600 using a barrel shifter method for cache utilization, in accordance with an embodiment of the present application. The utilization of cache 600 may be based on a barrel shifter method, in which data is sequentially written to a drive. When the drive is full, a write operation may loop to the beginning address of the drive to continue writing data. Cache 600 can include an offset 602 which denotes the data location, which is the same as the logical address. A read pointer 604 indicates the most recent read location, while a write pointer 606 indicates the most recent write location. Note that when the data in client cache 600 is copied into the storage cluster, the read for the copying operation is also performed sequentially. In general, read pointer 604 chases write pointer 606.

The data between read pointer 604 and write pointer 606 includes data which is waiting to be copied to the storage cluster (e.g., blocks 612, corresponding to "data flag=10"). After blocks 612 are written, some subsequent and consecutive blocks are reserved for the next write operation, where the corresponding physical locations are freed (deleted) as the reserved area. Write pointer 606 and free pointer 608 are moved, and the data between write pointer 606 and free pointer 608 includes free blocks which are available for an incoming write operation (e.g., blocks 614, corresponding to "data flag=01"). The remaining blocks can continue to hold data which has been successfully copied to the storage cluster and is ready to be deleted, but may continue to serve as the read cache (e.g., corresponding to "data flag=11").

Figure 7A:
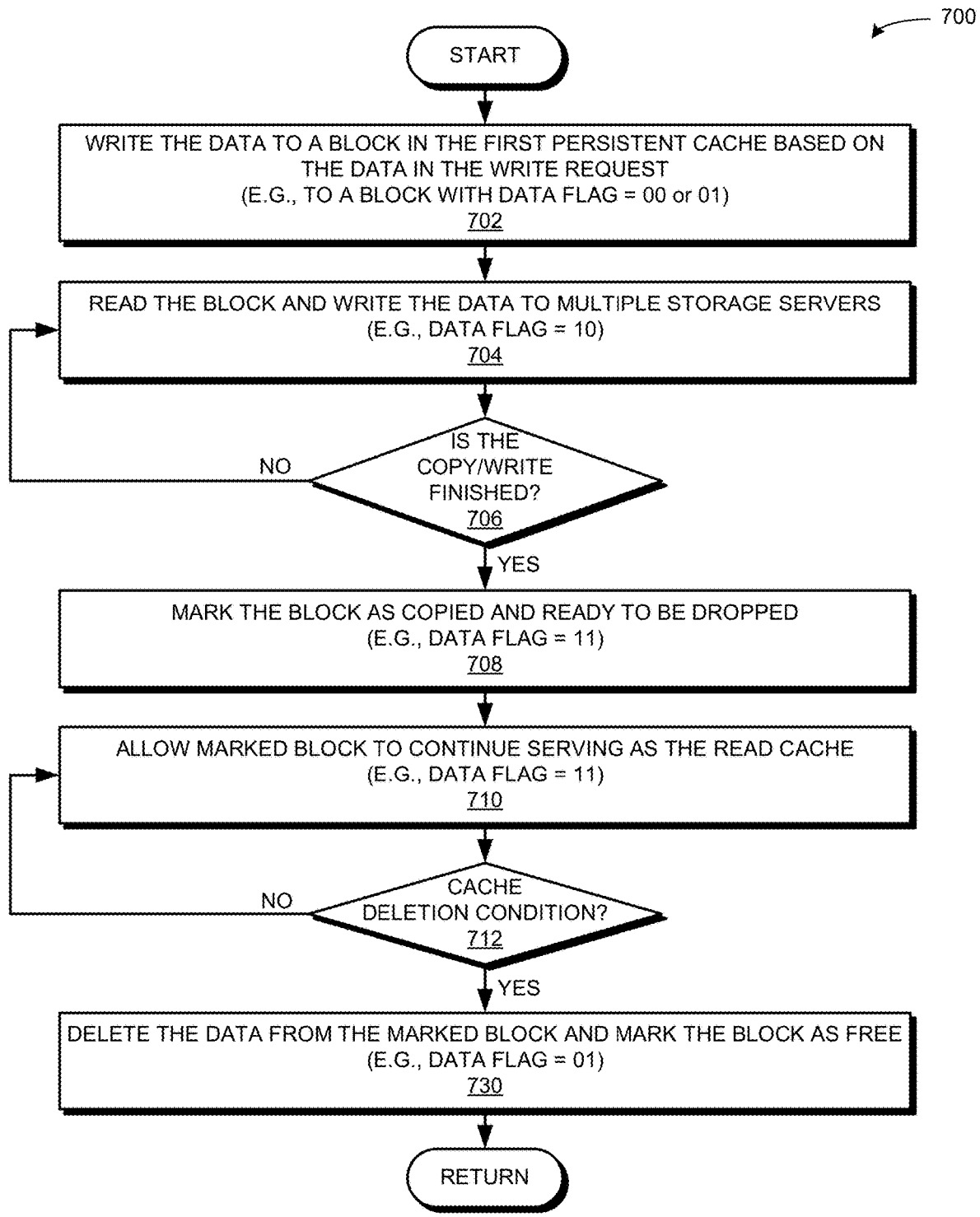
FIG. 7A presents a flowchart illustrating a method for handling data in a client-side global persistent cache using a barrel shifter method for cache utilization, in accordance with an embodiment of the present application.

Cache 600 may be held internally within a NAND flash device, which may move the data blocks around based on a cache deletion condition, e.g., garbage collection, wear leveling, and data retention, to increase the efficiency of client cache 600 for performance and longevity. FIG. 7A presents a flowchart 700 illustrating a method for handling data in a client-side global persistent cache using a barrel shifter method for cache utilization, in accordance with an embodiment of the present application. During operation, the system writes the data to a block in the first persistent cache based on the data in the write request (e.g., to a block with data flag=00 or 01) (operation 702). The system reads the block and writes the data to multiple storage servers (e.g., data flag=10) (operation 704). The system determines whether the copy/write is finished (decision 706). If it is not, the system returns to operation 704. If it is, the system marks the block as copied and ready to be dropped (e.g., data flag=11, indicating the block is ready to be deleted, removed, erased, etc.) (operation 708). The system allows the marked block to continue serving as the read cache (e.g., data flag=11) (operation 710). The system determines whether it detects a cache deletion condition (decision 712). If it does not, the system returns to operation 710. If it does, the system deletes the data from the marked block and marks the block as free (e.g., data flag=01) (operation 730). This means that the block is now ready to be written to.

Figure 7B:
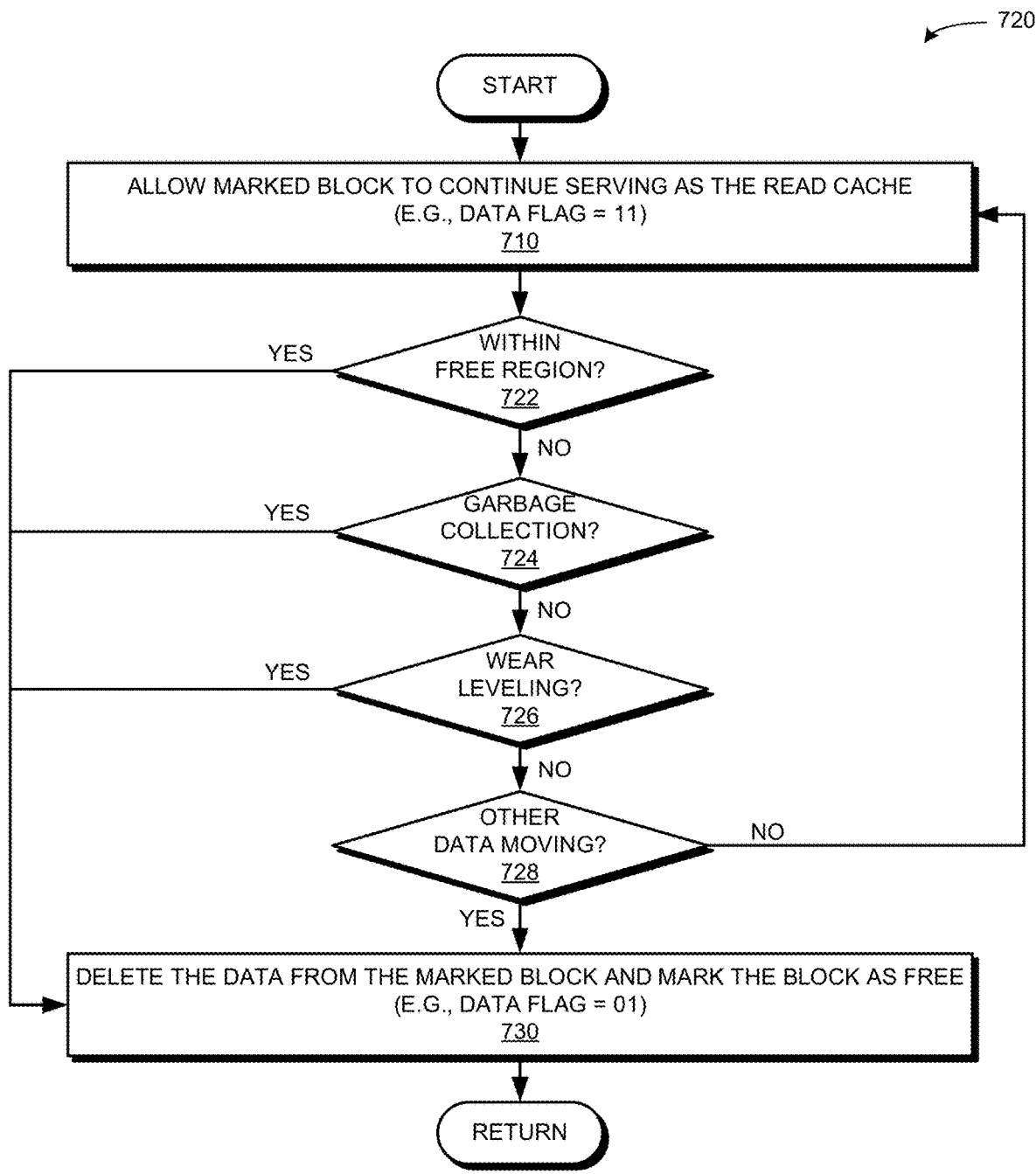
FIG. 7B presents a flowchart illustrating a method for handling data in a client-side global persistent cache based on various cache deletion conditions, in accordance with an embodiment of the present application.

FIG. 7B presents a flowchart 720 illustrating a method for handling data in a client-side global persistent cache based on various cache deletion conditions, in accordance with an embodiment of the present application. During operation, the system allows the marked block to continue serving as the read cache (e.g., data flag=11) (operation 710). The system determines whether it detects a cache deletion condition, by performing several decisions. Note that these decisions may occur in an order other than the one depicted in flowchart 720. If the system determines that the marked block is within a free region (decision 722), the system deletes the data from the marked block and marks the block as free (e.g., data flag=01) (operation 730). If the marked block is not within a free region (decision 722), and if the system determines that the marked block is due for a garbage collection process (decision 724), the system deletes the data from the marked block and marks the block as free (operation 730). If the system determines that the marked block is not due for a garbage collection process (decision 724), and if the system determines that the marked block exhibits a level of wear above a predetermined threshold (decision 726), the system deletes the data from the marked block and marks the block as free (operation 730). If the system determines that the marked block does not exhibit a degree of leveling above the predetermined threshold (decision 726), and if the system determines any condition which requires moving other data (decision 728), the system deletes the data from the marked block and marks the block as free (operation 730). If the system determines no other condition which requires moving other data (decision 728), the system allows the marked block to continue serving as the read cache (operation 710).

Exemplary Computer System and Device

Figure 8:
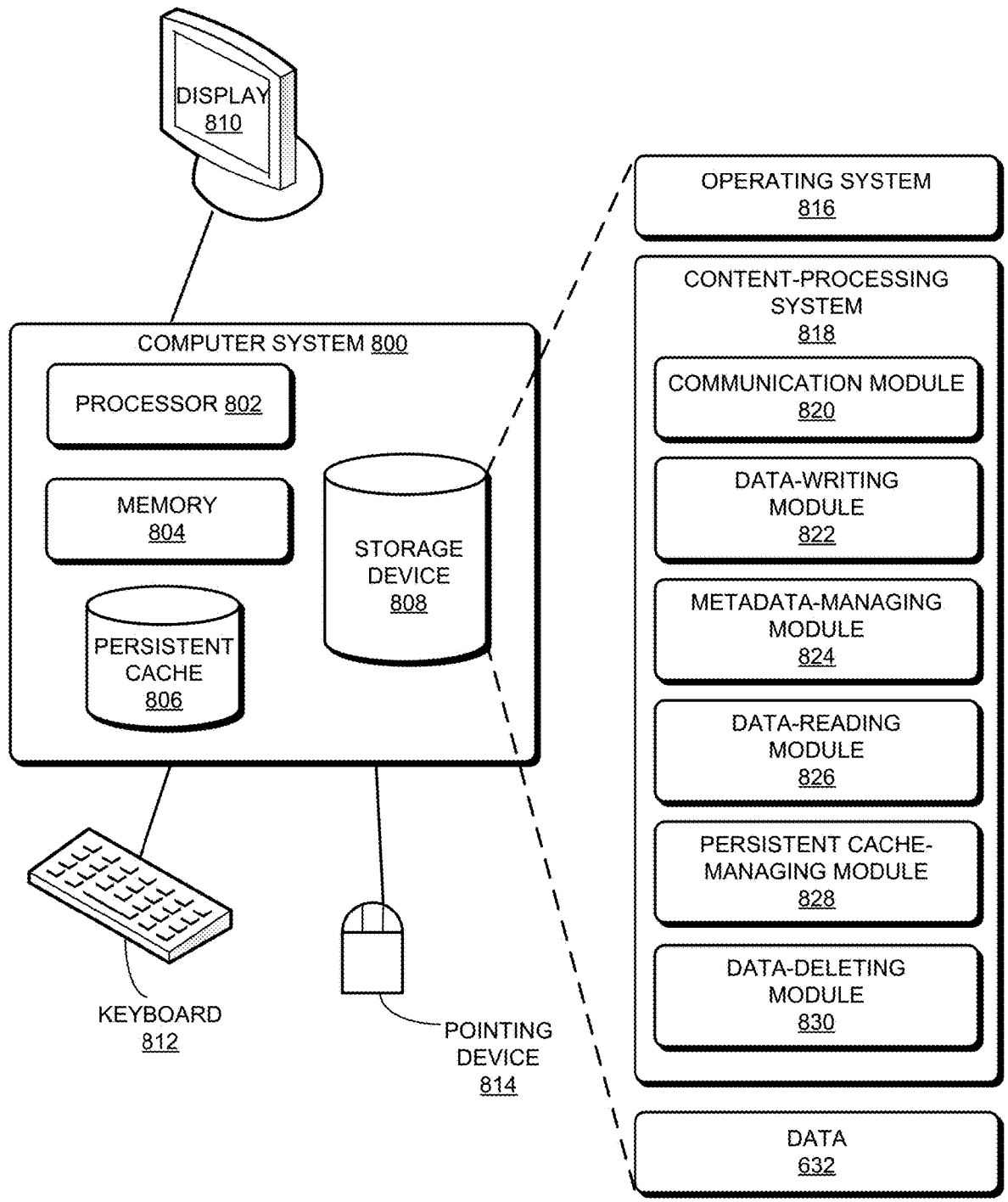
FIG. 8 illustrates an exemplary computer system that facilitates a distributed storage system with a client-side global persistent cache, in accordance with an embodiment of the present application.

FIG. 8 illustrates an exemplary computer system 800 that facilitates a distributed storage system with a client-side global persistent cache, in accordance with an embodiment of the present application. Computer system 800 includes a processor 802, a memory 804, a persistent cache 806, and a storage device 808. Computer system 800 may be a client-serving machine. Memory 804 can include a volatile memory (e.g., RAM) that serves as a managed memory, and can be used to store one or more memory pools. Persistent cache 806 can include non-volatile memory, which can be used to serve as long-term persistent storage. Furthermore, computer system 800 can be coupled to a display device 810, a keyboard 812, and a pointing device 814. Storage device 808 can store an operating system 816, a content-processing system 818, and data 832.

Content-processing system 818 can include instructions, which when executed by computer system 800, can cause computer system 800 to perform methods and/or processes described in this disclosure. Specifically, content-processing system 818 can include instructions for receiving and transmitting data packets, including a first request to write data, a second request to read data, a notification, a confirmation of a write request, and data indicated in or associated with a write or a read request. Content-processing system 818 can further include instructions for writing data to a first persistent cache (such as persistent cache 806) and to a second persistent cache (not shown), wherein the data is written directly to the second persistent cache based on a direct memory access protocol (data-writing module 822). Content-processing system 818 can include instructions for recording, in an entry in a global data structure, a status for the data (metadata-managing module 824). Content-processing system 818 can include instructions for sending a confirmation of the first request without storing the data in a remotely located storage server (communication module 820).

Content-processing system 818 can include instructions for determining two or more remotely located storage servers of a storage cluster to which the data is to be written (metadata-managing module 824). Content-processing system 818 can include instructions for, in response to successfully writing the data to the determined storage servers (data-writing module 822), updating the status in the entry (metadata-managing module 824).

Content-processing system 818 can include instructions for obtaining, from an entry in a global data structure, a current status for the data (metadata-managing module 824). Content-processing system 818 can include instructions for, in response to determining that the current status indicates that the data has been stored in the first persistent cache (metadata-managing module 824), reading the data from the first persistent cache (e.g., persistent cache 806) (data-reading module 826).

Content-processing system 818 can include instructions for, in response to determining that the current status indicates that the data has been deleted from the first persistent cache and has been stored in the storage cluster (metadata-managing module 824), reading the data from the storage cluster (e.g., a remotely located storage server of the storage cluster) (data-reading module 826). Content-processing system 818 can include instructions for, in response to successfully reading the data from the first persistent cache or from the storage cluster (data-reading module 826), returning the data indicated in the second request (communication module 820).

Content-processing system 818 can further include instructions for writing the data to a block in the first persistent cache (data-writing module 822). Content-processing system 818 can further include instructions for, in response to reading the block and successfully writing the data to the storage server (data-writing module 822), marking the block as copied to storage and ready to be deleted (persistent cache-managing module 828). Content-processing system 818 can further include instructions for, in response to determining a cache deletion condition (persistent cache-managing module 828): deleting the data from the marked block (data-deleting module 830); and marking the block as free (persistent cache-managing module 828).

Data 832 can include any data that is required as input or that is generated as output by the methods and/or processes described in this disclosure. Specifically, data 832 can store at least: data to be written or read; an entry in a global data structure; a status for data in an entry; a data flag; an indicator that data has been stored in a client-side global cache; an indicator that data has not yet been stored in a storage server or a storage cluster; an indicator that data has been stored in the storage server or the storage cluster; an indicator that data has been deleted from the client-side global cache; a notification that an entry has been successfully created and that the data may be committed to a client-side global cache; a confirmation of a write request; data indicated in a read request; a file name; an address; an offset; a client server identifier; a cache offset; a field in a global data structure entry which corresponds to data; metadata; an indicator of a free region; a garbage collection procedure; an indicator of a level of wear; a predetermined threshold for a level of wear; a condition which requires moving other data; a cache utilization method or technique; a read pointer; a write pointer; a free pointer; and an indicator of one or more blocks in a client-side global persistent cache.

Figure 9:
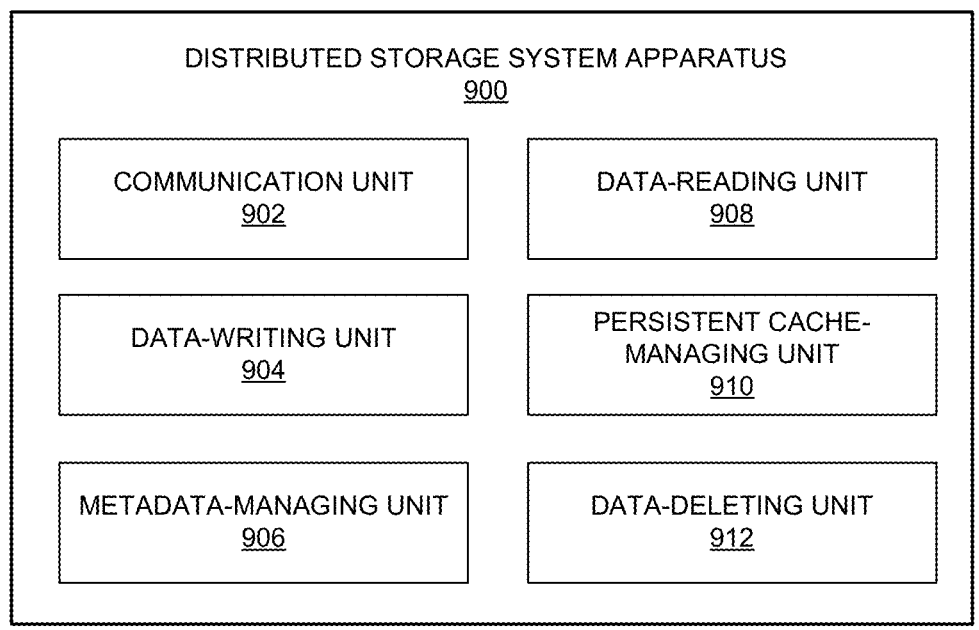
FIG. 9 illustrates an exemplary apparatus that facilitates a distributed storage system with a client-side global persistent cache, in accordance with an embodiment of the present application.

FIG. 9 illustrates an exemplary apparatus 900 that facilitates a distributed storage system with a client-side global persistent cache, in accordance with an embodiment of the present application. Apparatus 900 can comprise a plurality of units or apparatuses which may communicate with one another via a wired, wireless, quantum light, or electrical communication channel. Device 900 may be realized using one or more integrated circuits, and may include fewer or more units or apparatuses than those shown in FIG. 9. Further, device 900 may be integrated in a computer system, or realized as a separate device which is capable of communicating with other computer systems and/or devices. Specifically, device 900 can comprise units 902-912 which perform functions or operations similar to modules 820-830 of computer system 800 of FIG. 8, including: a communication unit 902; a data-writing unit 904; a metadata-managing unit 906; a data-reading unit 908; a persistent cache-managing unit 910, which can also include a persistent cache (not shown); and a data-deleting unit 912.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating a distributed storage system, the method comprising:
receiving, by a first client-serving machine, a first request to write data;
writing, by the first client-serving machine, the data to a first persistent cache associated with the first client-serving machine, wherein a persistent cache includes non-volatile memory;
recording, by a metadata-managing server in an entry in a global data structure, metadata associated with the data,
wherein the metadata indicates a status for the data prior to completing a write operation for the data in a storage server, wherein the status indicates that the data has been stored in the first persistent cache but has not yet been stored in the storage server, wherein the metadata-managing server is distinct from the first client-serving machine and the storage server,
wherein prior to completing the write operation for the data in the storage server, the method further comprises:
synchronizing, by the first client-serving machine, a path of the data with the metadata-managing server and a plurality of other metadata-managing servers; and
determining, by the metadata-managing server and the other metadata-managing servers, two or more storage servers of a storage cluster to which the data is to be written, wherein the two or more storage servers include a primary server and at least one other storage server, and
wherein completing the write operation for the data in the storage server comprises, in response to successfully writing the data to the determined storage servers, updating, by the metadata-managing server, the status in the entry with a value which indicates that the data has been stored in the storage cluster and which indicates that the data may be deleted from the first persistent cache associated with the first client-serving machine; and
obtaining, by the first client-serving machine from the metadata-managing server based on the entry in the global data structure, a current status for the data.

2. The method of claim 1, further comprising:
receiving, by the first client-serving machine, a second request to read the data;
in response to determining that the obtained current status indicates that the data is stored in both the first persistent cache and in the storage cluster:
indicating, by the metadata-managing server to the first client-serving machine, that the data is to be read from the first persistent cache; and
reading, by the first client-serving machine, the data from the first persistent cache;
in response to determining that the obtained current status indicates that the data is stored in the first persistent cache and not in the storage cluster, reading the data from the first persistent cache;

in response to determining that the obtained current status indicates that the data has been deleted from the first persistent cache and is stored in the storage cluster, reading the data from the storage cluster; and in response to successfully reading the data from the first persistent cache or the storage cluster, returning the data indicated in the second request.

3. The method of claim 1, wherein the metadata-managing server maintains the global data structure, and wherein the method further comprises:

receiving, by the first client-serving machine from the metadata-managing server, a first notification that the entry in the global data structure has been successfully created and that the data may be committed to the first persistent cache, wherein the entry indicates the metadata associated with the data; and in response to the first notification, sending a confirmation of the first request.

4. The method of claim 1, further comprising:

writing the data to a second persistent cache associated with a second client-serving machine, wherein the first client-serving machine and the second client-serving machine are assigned as a pair for facilitating high availability, wherein the second persistent cache is a paired mirror cache of the first persistent cache, and wherein the data is written directly to the second persistent cache based on a direct memory access protocol and without involving a CPU of the second client-serving machine.

5. The method of claim 1, wherein writing the data to and reading the data from the first persistent cache is based on a barrel shifter technique, wherein the data is sequentially written to the first persistent cache, wherein upon detecting that the first persistent cache is full, the data is written starting from a beginning address of the cache, and wherein a location for the data is an offset which is a logical address of the data location.

6. The method of claim 1, wherein writing the data to the first persistent cache further comprises:

writing the data to a block in the first persistent cache;

in response to reading the block and successfully writing the data to the storage server, marking the block as copied to storage and ready to be deleted, wherein the data may be read from the block until the data is deleted; and in response to determining a cache deletion condition:
  deleting the data from the marked block; and
  marking the block as free.

7. The method of claim 6, wherein determining the cache deletion condition includes one or more of:

determining that the block resides within a free region of the cache;

determining that the block is due for a garbage collection process;

determining that the block exhibits a level of wear above a predetermined threshold; and determining any condition which requires moving other data.

8. The method of claim 1, further comprising:

sending a confirmation of the first request without storing the data in the storage server.

9. A computer system for facilitating a distributed storage system, the system comprising:

a processor; and a memory coupled to the processor and storing instructions, which when executed by the processor cause the processor to perform a method, wherein the computer system comprises a first client-serving machine, the method comprising:

receiving, by the first client-serving machine, a first request to write data;

writing, by the first client-serving machine, the data to a first persistent cache associated with the first client-serving machine, wherein a persistent cache includes non-volatile memory;

recording, by a metadata-managing server in an entry in a global data structure, metadata associated with the data, wherein the metadata indicates a status for the data prior to completing a write operation for the data in a storage server, wherein the status indicates that the data has been stored in the first persistent cache but has not yet been stored in the storage server, wherein the metadata-managing server is distinct from the first client-serving machine and the storage server, wherein prior to completing the write operation for the data in the storage server, the method further comprises:

synchronizing, by the first client-serving machine, a path of the data with the metadata-managing server and a plurality of other metadata-managing servers; and determining, by the metadata-managing server and the other metadata-managing servers, two or more storage servers of a storage cluster to which the data is to be written, wherein the two or more storage servers include a primary server and at least one other storage server, and wherein completing the write operation for the data in the storage server comprises, in response to successfully writing the data to the determined storage servers, updating, by the metadata-managing server, the status in the entry with a value which indicates that the data has been stored in the storage cluster and which indicates that the data may be deleted from the first persistent cache associated with the first client-serving machine; and obtaining, by the first client-serving machine from the metadata-managing server based on the entry in the global data structure, a current status for the data.

10. The computer system of claim 9, wherein the method further comprises:

receiving, by the first client-serving machine, a second request to read the data;

in response to determining that the obtained current status indicates that the data is stored in both the first persistent cache and in the storage cluster:

indicating, by the metadata-managing server to the first client-serving machine, that the data is to be read from the first persistent cache; and reading, by the first client-serving machine, the data from the first persistent cache;

in response to determining that the obtained current status indicates that the data is stored in the first persistent cache and not in the storage cluster, reading the data from the first persistent cache;

in response to determining that the obtained current status indicates that the data has been deleted from the first persistent cache and is stored in the storage cluster, reading the data from the storage cluster; and in response to successfully reading the data from the first persistent cache or the storage cluster, returning the data indicated in the second request.

11. The computer system of claim 9, wherein the metadata-managing server maintains the global data structure, and wherein the method further comprises:

receiving, by the first client-serving machine from the metadata-managing server, a first notification that the entry in the global data structure has been successfully created and that the data may be committed to the first persistent cache, wherein the entry indicates the metadata associated with the data; and in response to the first notification, sending a confirmation of the first request.

12. The computer system of claim 9, further comprising:

writing the data to a second persistent cache associated with a second client-serving machine, wherein the first client-serving machine and the second client-serving machine are assigned as a pair for facilitating high availability, wherein the second persistent cache is a paired mirror cache of the first persistent cache, and wherein the data is written directly to the second persistent cache based on a direct memory access protocol and without involving a CPU of the second client-serving machine.

13. The computer system of claim 9, wherein writing the data to and reading the data from the first persistent cache is based on a barrel shifter technique, wherein the data is sequentially written to the first persistent cache, wherein upon detecting that the first persistent cache is full, the data is written starting from a beginning address of the cache, and wherein a location for the data is an offset which is a logical address of the data location.

14. The computer system of claim 9, wherein writing the data to the first persistent cache further comprises:

writing the data to a block in the first persistent cache;

in response to reading the block and successfully writing the data to the storage server, marking the block as copied to storage and ready to be deleted, wherein the data may be read from the block until the data is deleted; and in response to determining a cache deletion condition:
deleting the data from the marked block; and
marking the block as free.

15. The computer system of claim 14, wherein determining the cache deletion condition includes one or more of:

determining that the block resides within a free region of the cache;

determining that the block is due for a garbage collection process;

determining that the block exhibits a level of wear above a predetermined threshold; and determining any condition which requires moving other data.

16. A non-transitory computer-readable storage medium storing instructions that when executed by a computer cause the computer to perform a method, the method comprising:

receiving, by a first client-serving machine, a first request to write data;

writing, by the first client-serving machine, the data to a first persistent cache associated with the first client-serving machine, wherein a persistent cache includes non-volatile memory;

recording, by a metadata-managing server in an entry in a global data structure, metadata associated with the data, wherein the metadata indicates a status for the data prior to completing a write operation for the data in a storage server, wherein the status indicates that the data has been stored in the first persistent cache but has not yet been stored in the storage server, wherein the metadata-managing server is distinct from the first client-serving machine and the storage server, wherein prior to completing the write operation for the data in the storage server, the method further comprises:

synchronizing, by the first client-serving machine, a path of the data with the metadata-managing server and a plurality of other metadata-managing servers; and determining, by the metadata-managing server and the other metadata-managing servers, two or more storage servers of a storage cluster to which the data is to be written, wherein the two or more storage servers include a primary server and at least one other storage server, and wherein completing the write operation for the data in the storage server comprises, in response to successfully writing the data to the determined storage servers, updating, by the metadata-managing server, the status in the entry with a value which indicates that the data has been stored in the storage cluster and which indicates that the data may be deleted from the first persistent cache associated with the first client-serving machine; and obtaining, by the first client-serving machine from the metadata-managing server based on the entry in the global data structure, a current status for the data.

17. The storage medium of claim 16, wherein the method further comprises:

receiving, by the first client-serving machine, a second request to read the data;

in response to determining that the obtained current status indicates that the data is stored in both the first persistent cache and in the storage cluster:

indicating, by the metadata-managing server to the first client-serving machine, that the data is to be read from the first persistent cache; and reading, by the first client-serving machine, the data from the first persistent cache without changing the current status for the data in the entry;

in response to determining that the obtained current status indicates that the data is stored in the first persistent cache and not in the storage cluster, reading the data from the first persistent cache without changing the current status for the data in the entry;

in response to determining that the obtained current status indicates that the data has been deleted from the first persistent cache and is stored in the storage cluster, reading the data from the storage cluster; and in response to successfully reading the data from the first persistent cache or the storage cluster, returning the data indicated in the second request.

18. The storage medium of claim 16, wherein writing the data to and reading the data from the first persistent cache is based on a barrel shifter technique, wherein the data is sequentially written to the first persistent cache, wherein upon detecting that the first persistent cache is full, the data is written starting from a beginning address of the cache, and wherein a location for the data is an offset which is a logical address of the data location; and wherein writing the data to the first persistent cache further comprises:

writing the data to a block in the first persistent cache;

in response to reading the block and successfully writing the data to the storage server, marking the block as copied to storage and ready to be deleted, wherein the data may be read from the block until the data is deleted; and in response to determining a cache deletion condition:
deleting the data from the marked block; and
marking the block as free.

19. The method of claim 1, wherein determining the two or more storage servers of a storage cluster to which the data is to be written is based on a data flag indicated for the data in the entry in the global data structure.

20. The method of claim 1, wherein the metadata further indicates one or more of:

a file name;
an address;
an offset;
a cache offset; and
a state or a data flag associated with the data.

* * * * *